(12) United States Patent
Fwu

(10) Patent No.: US 7,272,193 B2
(45) Date of Patent: Sep. 18, 2007

(54) RE-MAPPING TRELLIS ENCODED DATA ASSOCIATED WITH A 2-BIT CONSTELLATION TONE TO DATA ASSOCIATED WITH A PAIR OF 1-BIT CONSTELLATION TONES

(75) Inventor: Jong-Kae Fwu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 975 days.

(21) Appl. No.: 10/609,731

(22) Filed: Jun. 30, 2003

(65) Prior Publication Data
US 2004/0264499 A1   Dec. 30, 2004

(51) Int. Cl.
H04L 5/12   (2006.01)

(52) U.S. Cl. .................................................. 375/265
(58) Field of Classification Search ............... 375/242, 375/246, 247, 260, 261, 265, 295; 704/242; 714/792; 370/207; 455/428
See application file for complete search history.

(56) References Cited

U.S. PATENT DOCUMENTS

2004/0001552 A1*   1/2004   Koifman ..................... 375/260
2004/0021595 A1*   2/2004   Erdogan et al. ............. 341/144

* cited by examiner

*Primary Examiner*—Sam K. Ahn
(74) *Attorney, Agent, or Firm*—Buckley, Maschoff & Talwalkar LLC

(57) ABSTRACT

According to some embodiments, Trellis encoded data associated with a 2-bit constellation tone is re-mapped to data associated with a pair of 1-bit constellation tones.

19 Claims, 11 Drawing Sheets

ORIGINAL
TONE ORDER

TONE 2

TONE 3

TONE 8

TONE 1

TONE 4

TONE 7

TONE 6

TONE 5

500

NUMBERS OF BITS
SUPPORTED
(BASED ON QUALITY
OF TONE SIGNAL)

TONE 1:       2 BITS

TONE 2:       3 BITS

TONE 3:       1 BIT

TONE 4:       2 BITS

TONE 5:       2 BITS

TONE 6:       1 BIT

TONE 7:       3 BITS

TONE 8:       4 BITS

US 7,272,193 B2

RE-MAPPING TRELLIS ENCODED DATA ASSOCIATED WITH A 2-BIT CONSTELLATION TONE TO DATA ASSOCIATED WITH A PAIR OF 1-BIT CONSTELLATION TONES

BACKGROUND

A modem can be used to exchange information through a communication network. Moreover, the modem may include a data pump to facilitate the exchange of information in accordance with a particular protocol. For example, the data pump might be adapted to receive and transmit data over a telephone wire in accordance with a Digital Subscriber Line (DSL) protocol.

DETAILED DESCRIPTION

Some embodiments of the present invention are associated with the exchange of data through a channel (e.g., a telephone wire). To increase the rate at which information can be exchanged, the channel's bandwidth may be divided into a number of subchannels (and data can be simultaneously transmitted via each subchannel). For example, 1.1 MegaHertz (MHz) of available bandwidth could be divided into 256 separate subchannels, also referred to as "tones", each tone having a bandwidth of 4 KiloHertz (KHz).

To further improve performance, phase and amplitude modulation may be used to increase the amount of information that can be simultaneously transmitted using a particular tone. For example, a phase value can represent an angle and an amplitude value can represent a distance as illustrated by the X-Y axis 100 in FIG. 1. In this case, different phase and amplitude combinations will represent different points on the axis 100, and each point can be assigned a particular combination of bits (e.g., "10" or "11"). Such an approach is referred to as "constellation" mapping.

Figure 1:
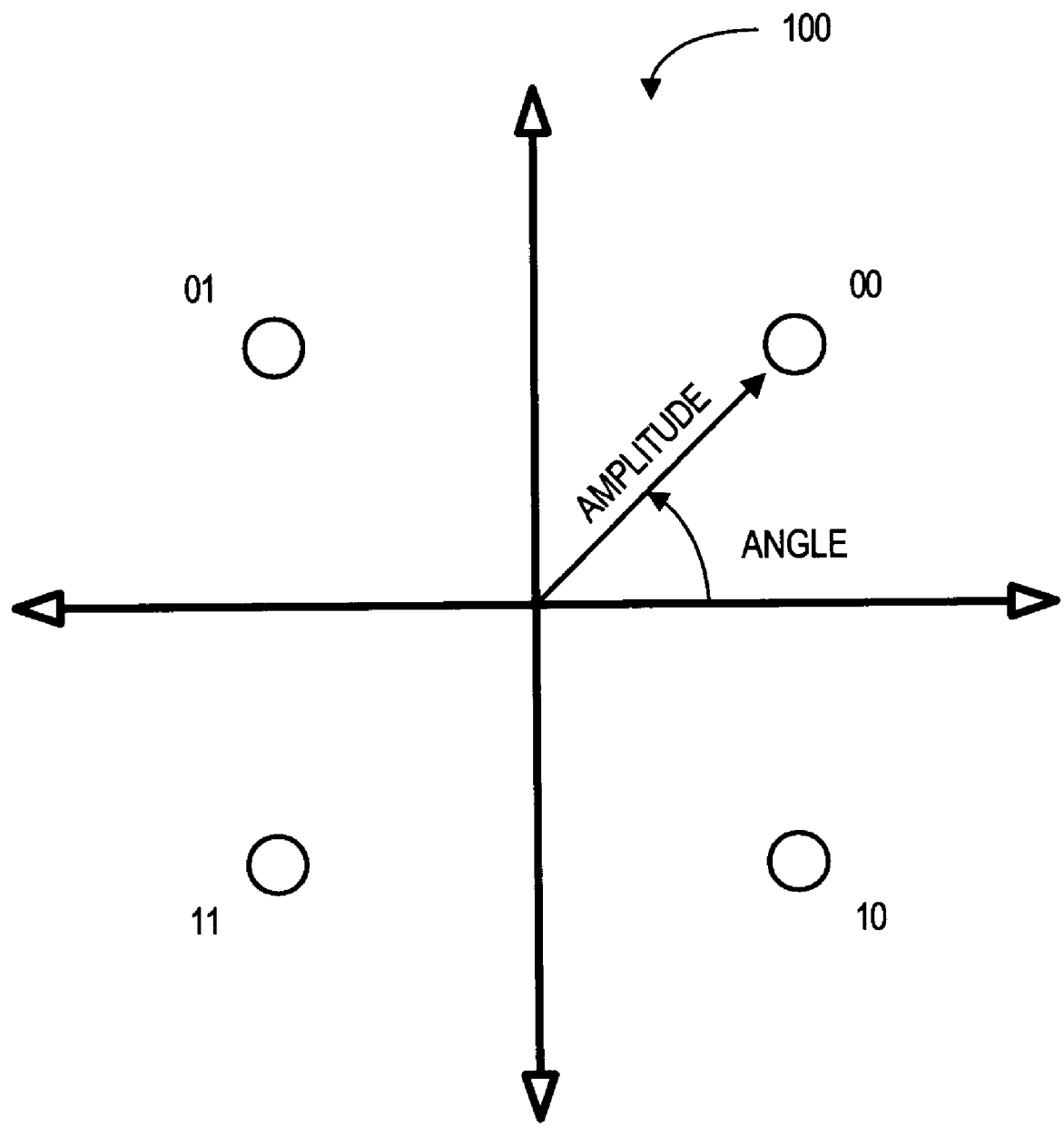
FIG. 1 illustrates an X-Y axis and a constellation pattern.

Although four points are illustrated in the constellation pattern of FIG. 1, other numbers of points may be defined. For example, Quadrature Amplitude Modulation (QAM) might define sixty-four constellation points (and therefore up to six bits of data could be transmitted simultaneously). Generally, a higher quality tone signal (e.g., associated with a high signal-to-noise ratio) can support more points (and thus be able to transmit more data simultaneously) as compared to a lower quality tone signal. Note the quality of one tone in a channel can be different than the quality of another tone in the same channel. For example, one tone might be able to carry eight bits while another tone is only able to carry a single bit (which is referred to as a "1-bit constellation tone").

A large enough error in the phase or angle information will cause an incorrect point in the constellation to be interpreted (resulting in an error in the exchanged data). To address this problem, Trellis Coded Modulation (TCM) combines coding and error correction techniques by adding additional bits that can be used to determine what data that was actually transmitted. In one approach, two tones—each able to support two or more bits—are paired and Trellis encoding/decoding is performed on the pair of tones. In this case, any 1-bit constellation tones are not used. Examples of this approach include the International Telecommunication Union (ITU) Recommendation G.992.1 entitled "Asymmetrical Digital Subscriber Line (ADSL) Transceivers" (1999) and Recommendation G.992.2 entitled "Splitterless Asymmetric Digital Subscriber Line (ADSL) Transceivers" (1999).

To improve performance, two 1-bit constellation tones can be paired to create a pseudo 2-bit constellation tone. The pseudo 2-bit constellation tone is then used to exchange information (e.g., and Trellis encoding/decoding can be performed with respect to the pseudo 2-bit constellation tone). One example of the approach is ITU Recommendation G.992.3 entitled "Asymmetrical Digital Subscriber Line (ADSL) Transceivers-2 (ADSL2)" (2002).

To perform constellation mapping, tone pairing, Trellis encoding (or decoding), and/or other functions, an Application Specific Integrated Circuit (ASIC) device may be provided. Note, however, that an ASIC device that was designed to perform Trellis encoding/decoding only for tones that can support 2-bit or higher constellations (such as one designed for G.992.1 and/or G.992.2) might not be able to perform certain functions for a 1-bit constellation (e.g., as defined in ADSL2). Although the ASIC device could be re-designed to support 1-bit constellations, this approach could be costly and time consuming. Moreover, algorithms and/or technical standards that are developed after the ASIC device is re-designed might not be supported.

Transmit Path

Figure 2:
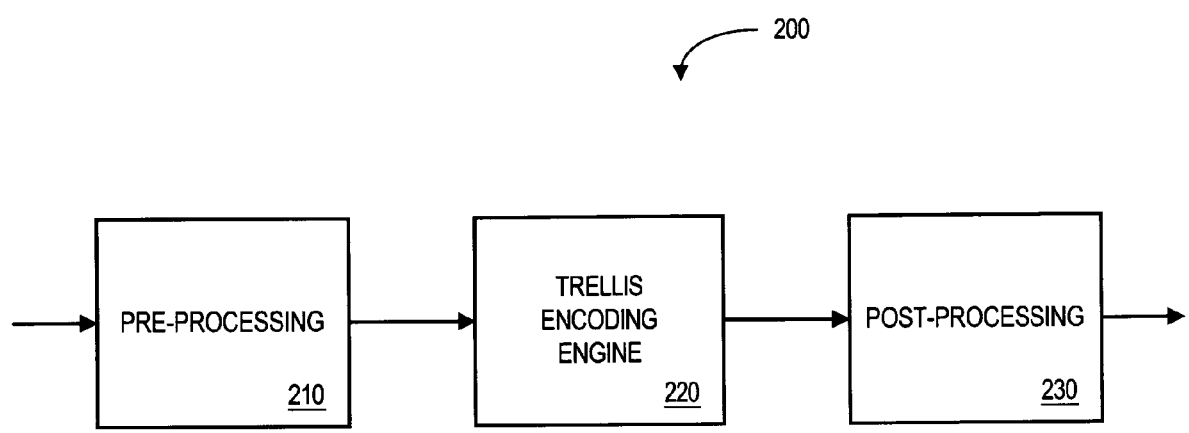
FIG. 2 is a block diagram of a transmit path according to some embodiments.

FIG. 2 is a transmit path 200 according to some embodiments. The transmit path 200 may be associated with, for example, an ADSL2 data pump.

A pre-processing device 210 receives data to be transmitted and provides information to a Trellis encoding engine 220. A post-processing device 230 receives information from the Trellis encoding engine 220 and provides data to be transmitted (e.g., via a telephone wire). The pre-processing device 210 and post-processing device 230 may comprise, for example, firmware or software devices. The Trellis encoding engine 220 might be, for example, an ASIC device (e.g., a sub-block in an integrated circuit) designed to support G.992.1 and/or G.992.2.

Figure 3:
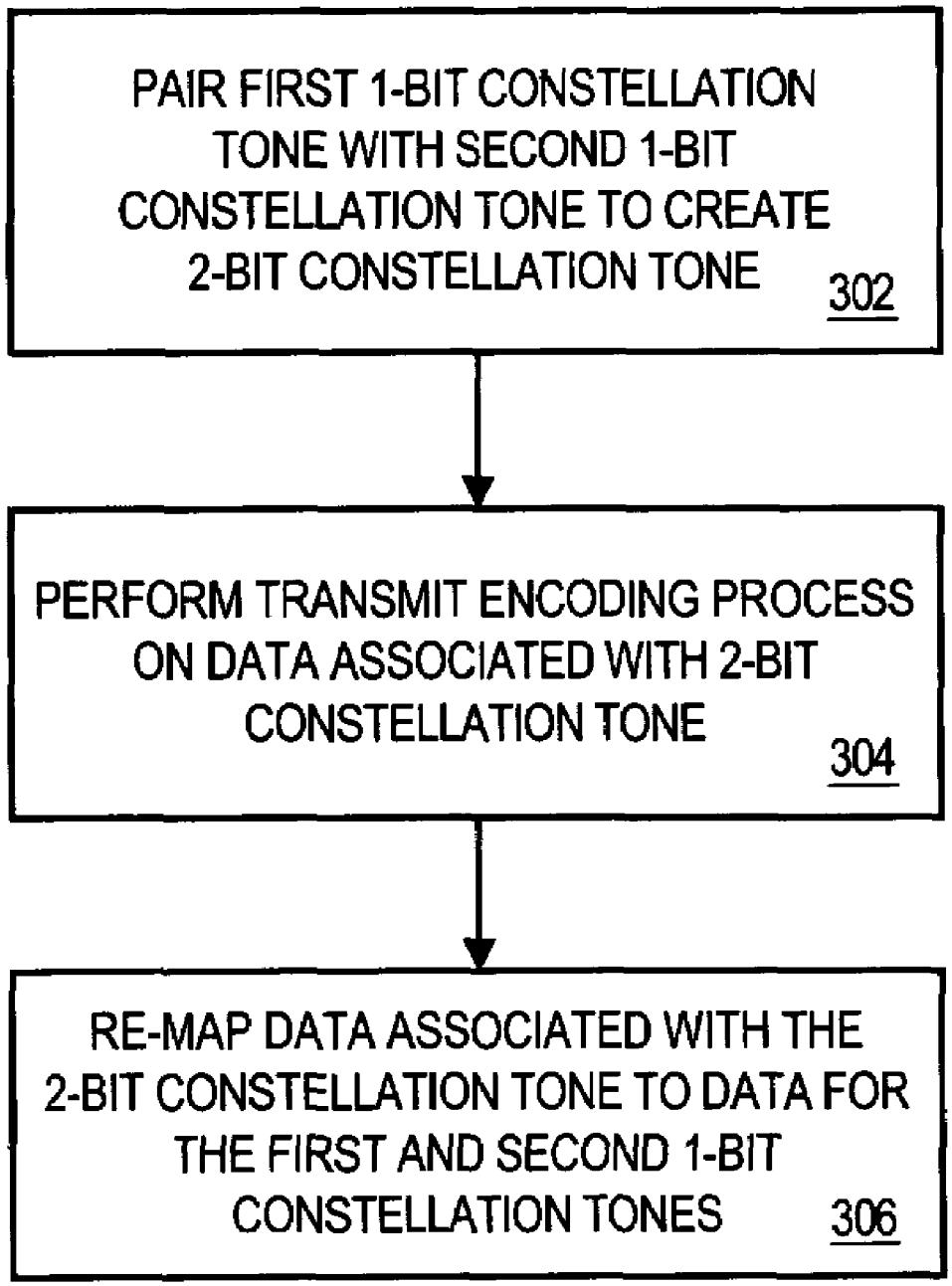
FIG. 3 is a transmit method according to some embodiments.

FIG. 3 is a flow chart of a method according to some embodiments. The flow charts described herein do not necessarily imply a fixed order to the actions, and embodiments may be performed in any order that is practicable. The method of FIG. 3 may be associated with, for example, the transmit path 200. Note that any of the methods described herein may be performed by firmware, hardware, software, or any combination of these techniques. For example, a storage medium may store thereon instructions that when executed by a machine result in performance according to any of the embodiments described herein.

Figure 4:
FIG. 4 illustrates an original tone order according to some embodiments.

Recall that the bandwidth of a single communication channel (e.g., a telephone wire) may be divided into a number of different tones. As illustrated in FIG. 4, an original tone order 400 (e.g., a table) may be established to indicate the order in which these tone will be processed. Although eight tones will be used as an example, any number of tones may be supported in accordance with embodiments described herein.

Another way of expressing the original tone order 400 is to have t represent the tone index for i=1 to the Number of Subcarriers (NSC). That is, in this example t=[2, 3, 8, 1, 4, 7, 6, 5].

Figure 5:
FIG. 5 illustrates numbers of bits supported in each tone according to some embodiments.

As illustrated in FIG. 5, each of the eight tones may be able simultaneously exchange a different number of bits. In particular, the numbers of bits supported 500 (e.g., a table) by the tones may be associated with the quality of the tone signal. In this example, the eighth tone can support a 4-bit constellation while the third tone can only support a 1-bit constellation. Another way of expressing the numbers of bits supported 500 is to have b represent the numbers of bits supported in ascending order of tone frequency. In this example, b=[2, 3, 1, 2, 2, 1, 3, 4]. Note that b may be defined, for example, when a communication link is established via a channel (e.g., after the quality of each tone signal has been tested).

Figure 6:
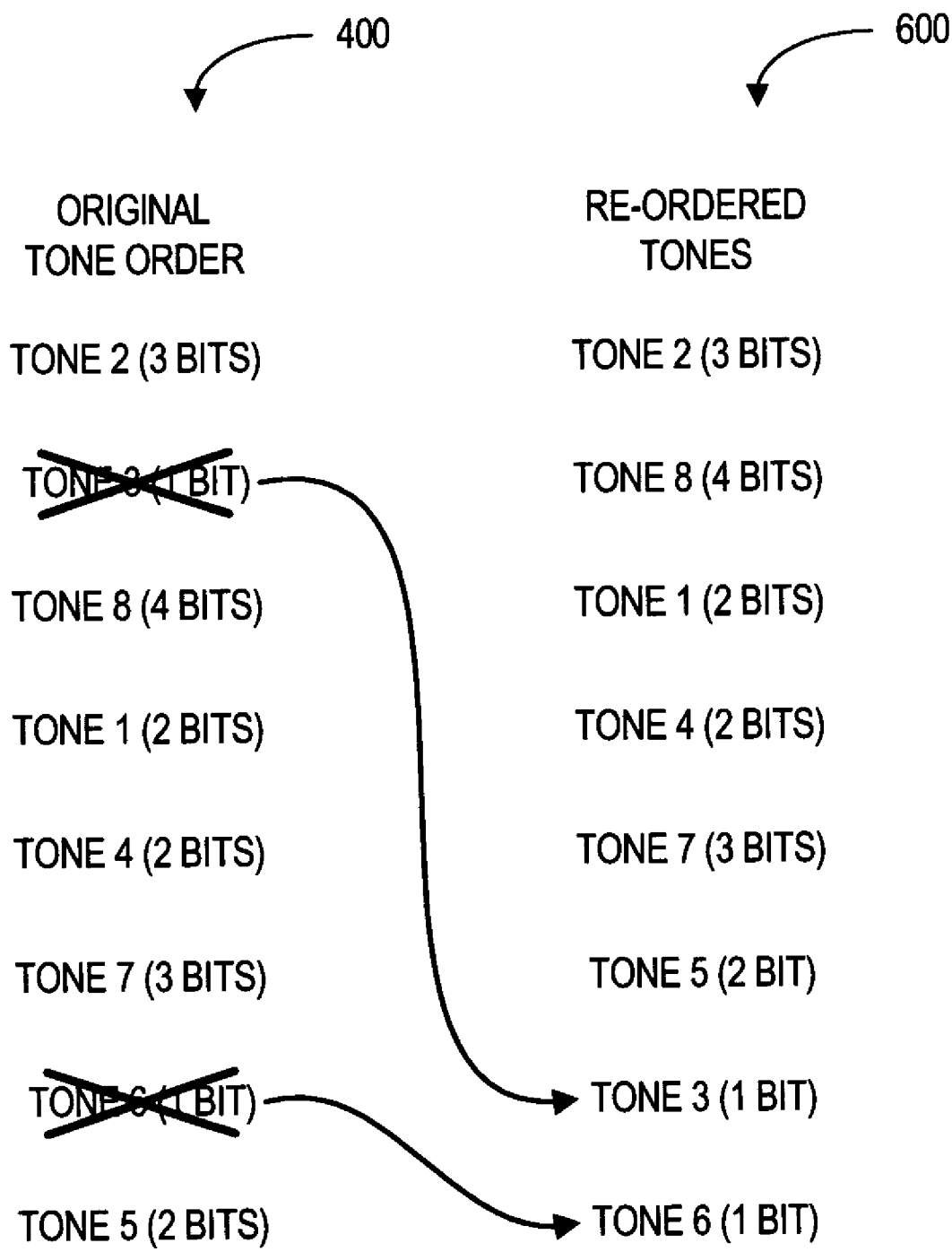
FIG. 6 illustrates a list of re-ordered tones according to some embodiments.

A list of re-ordered tones 600 (e.g., a table) may then be generated based on the original tone order 400 and the numbers of bits supported 500 as illustrated in FIG. 6. For example, 1-bit constellation tones may be moved to the bottom of the list. In this example, the second and seventh tones in the original tone order 400 (i.e., originally tons 3 and 6) have been moved to the bottom of the list, and the re-ordered tones may be represented by t'=[2, 8, 1, 4, 7, 5, 3, 6]. Constellation mapping may then occur in sequence according to t' and with the numbers of bits as indicated by b.

Figure 7:
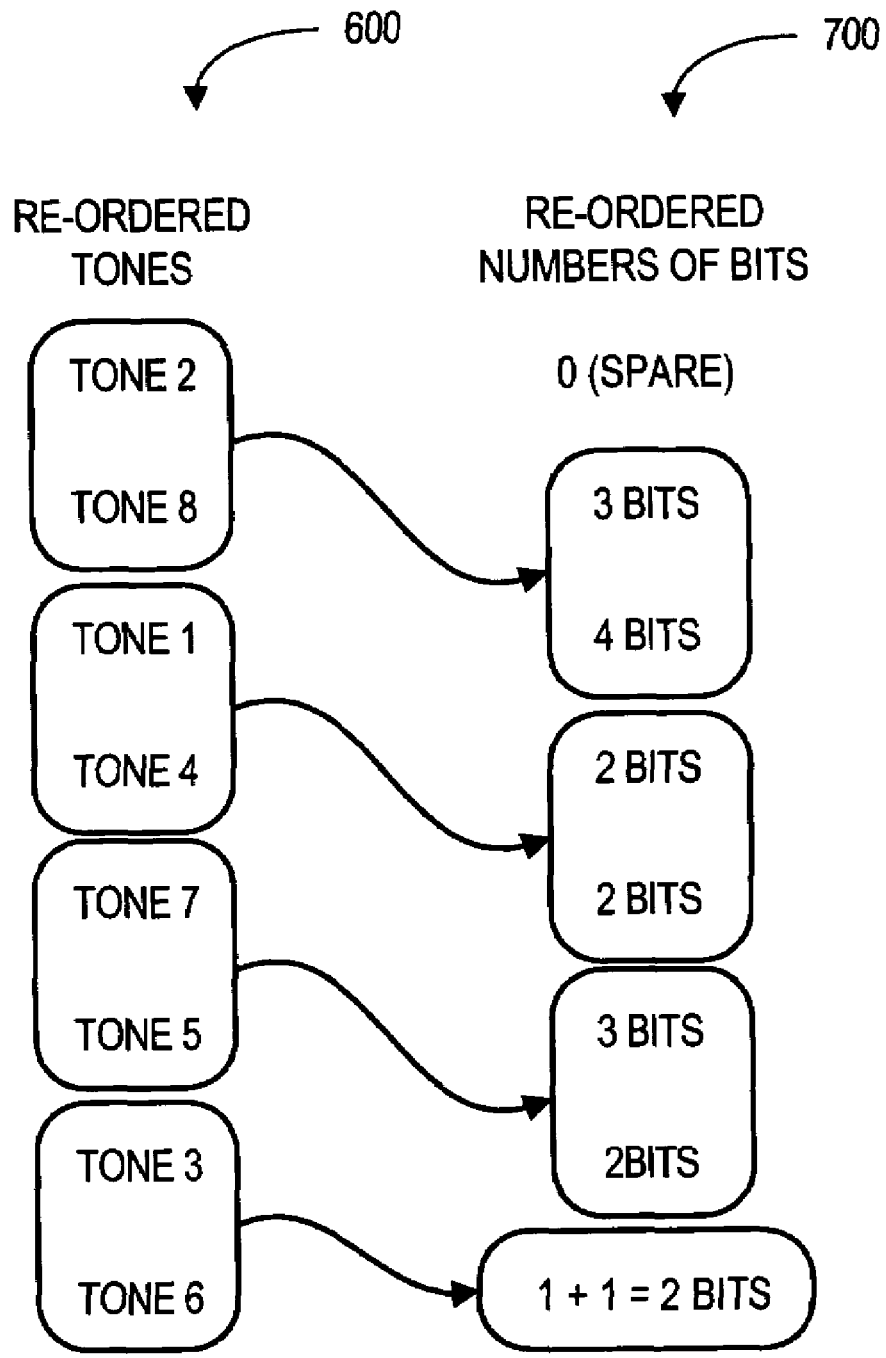
FIG. 7 illustrates a list of re-ordered numbers of bits supported according to some embodiments.

As illustrated in FIG. 7, the list of re-ordered tones 600 may then be used to select pairs of tones. For example, tones 2 and 8 may be paired and tones 1 and 4 may be paired. The tones may be paired, for example, so that a redundant bit can be added to each pair during a Trellis encoding process.

Referring again to FIG. 3, a first 1-bit constellation tone may be paired with a second 1-bit constellation tone to create a 2-bit constellation tone. In this example, the seventh and eighth tones in the list of re-ordered tones 600 (i.e., tones 3 and 6) have been paired.

The list of re-ordered tones 600 may also be used to generate a list of re-ordered numbers of bits 700 or b'. According to some embodiments, a spare location is provided at the top of the list 700 for each pair of 1-bit constellation tones in the list of re-ordered tones 600. The numbers of bits are then listed in accordance with the list of re-ordered tones 600 (and the information in FIG. 5), but the pair of 1-bit constellation tones are represented by a single pseudo 2-bit constellation value (ie., the eighth value in the list 700).

The processes associated with the numbers of bits supported 500, the list of re-ordered tones 600, the tone pairing, and/or the list of re-ordered tones 600 may be performed, for example, by the pre-processing device 210 (e.g., firmware).

At 304, a transmit encoding process is performed on data associated with the pseudo 2-bit constellation tone (e.g., on data stored in a transmit input buffer). For example, the Trellis encoding engine 220 may perform Trellis encoding according to b' (e.g., TCM may be performed in accordance with a DMT and/or ADSL protocol) and a result (e.g., [Xi, Yi]) may be stored in a transmit output buffer.

At 306, data associated with the pseudo 2-bit constellation tone is re-mapped to data associated with the first and second 1-bit constellation tones. For example, [Xi, Yi] for the pseudo 2-bit constellation tone may be re-mapped to [X1, Y1] and [X2, Y2] for the two 1-bit constellation tones. Note that, according to some embodiments:

$$X=(X2+Y2)/2;$$

$$Y=(X1+Y1)/2;$$

$$X1=Y1; \text{ and}$$

$$X2=Y2.$$

As a result, X1=Y1=Y and X2=Y2=X. In other words, the post-processing device 230 (e.g., firmware) may associate the first 1-bit constellation tone with coordinate [Y, Y] and the second 1-bit constellation tone with coordinate [X, X].

The data may then be transmitted (e.g., via a telephone wire) via the first and second 1-bit constellation tones in accordance with the re-mapping. Note that the Trellis encoding engine 220 may not need to perform any function associated with a 1-bit constellation tone differently than it would for a 2-bit constellation tone. As a result, a Trellis encoding engine 220 (e.g., an ASIC device) designed in accordance with G.992.1 and/or G.992.2 may be used to support the ADSL2 protocol. That is, the differences between the protocols can be handled by the pre-processing device 210 and/or the post-processing device 230 (e.g. firmware).

Receive Path

Figure 8:
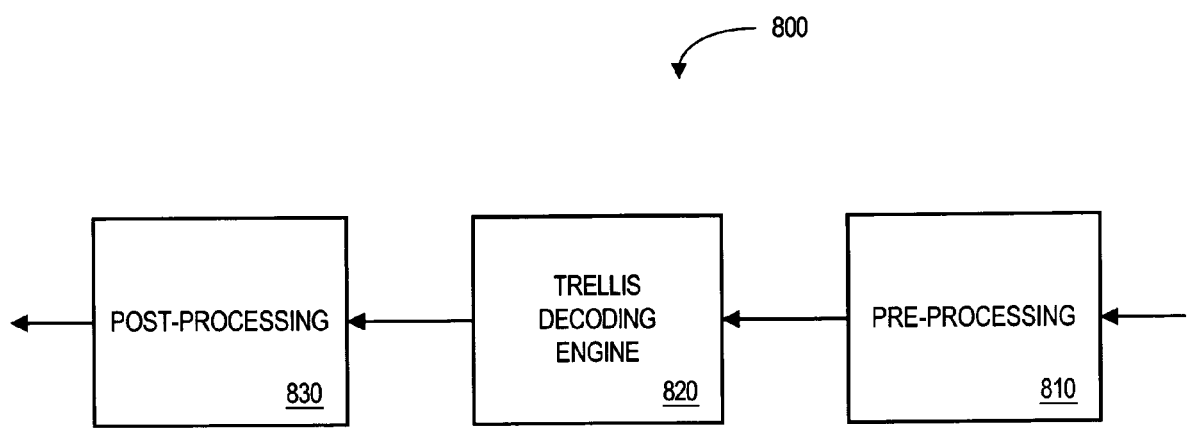
FIG. 8 is a block diagram of a receive path according to some embodiments.

FIG. 8 is a receive path 800 according to some embodiments. The receive path 800 may be associated with, for example, an ADSL2 data pump.

A pre-processing device 810 receives data (e.g., via a telephone wire) and provides information to a Trellis decoding engine 820. A post-processing device 830 receives information from the Trellis decoding engine 820 and provides data. The pre-processing device 810 and post-processing device 830 may comprise, for example, firmware or software devices. The Trellis decoding engine 820 might be, for example, an ASIC device designed to support G.992.1 and/or G.992.2.

In this case, constellation re-mapping may merge data associated with two 1-bit constellation tones (e.g., [X1, Y1], [X2, Y2]) into data associated with a pseudo 2-bit constellation tone (e.g., [X, Y]). In the previous example, the data associated with 1-bit constellation tone 3 may be [X1, Y1], and the data associated with 1-bit constellation tone 6 may be [X2, Y2]. This may be re-mapped into a pseudo 2-bit constellation tone as follows:

$$X=(X2+Y2)/2; \text{ and}$$

$$Y=(X1+Y1)/2.$$

After the re-mapping, the information contained in the pair of 1-bit constellation tones [X1, Y1] and [X2, Y2] is equal to the information contained in the pseudo 2-bit constellation tone [X, Y]. After the Trellis decoding engine 820 processes the information, a result may be stored in a receive output buffer.

EXAMPLE

Figure 9:
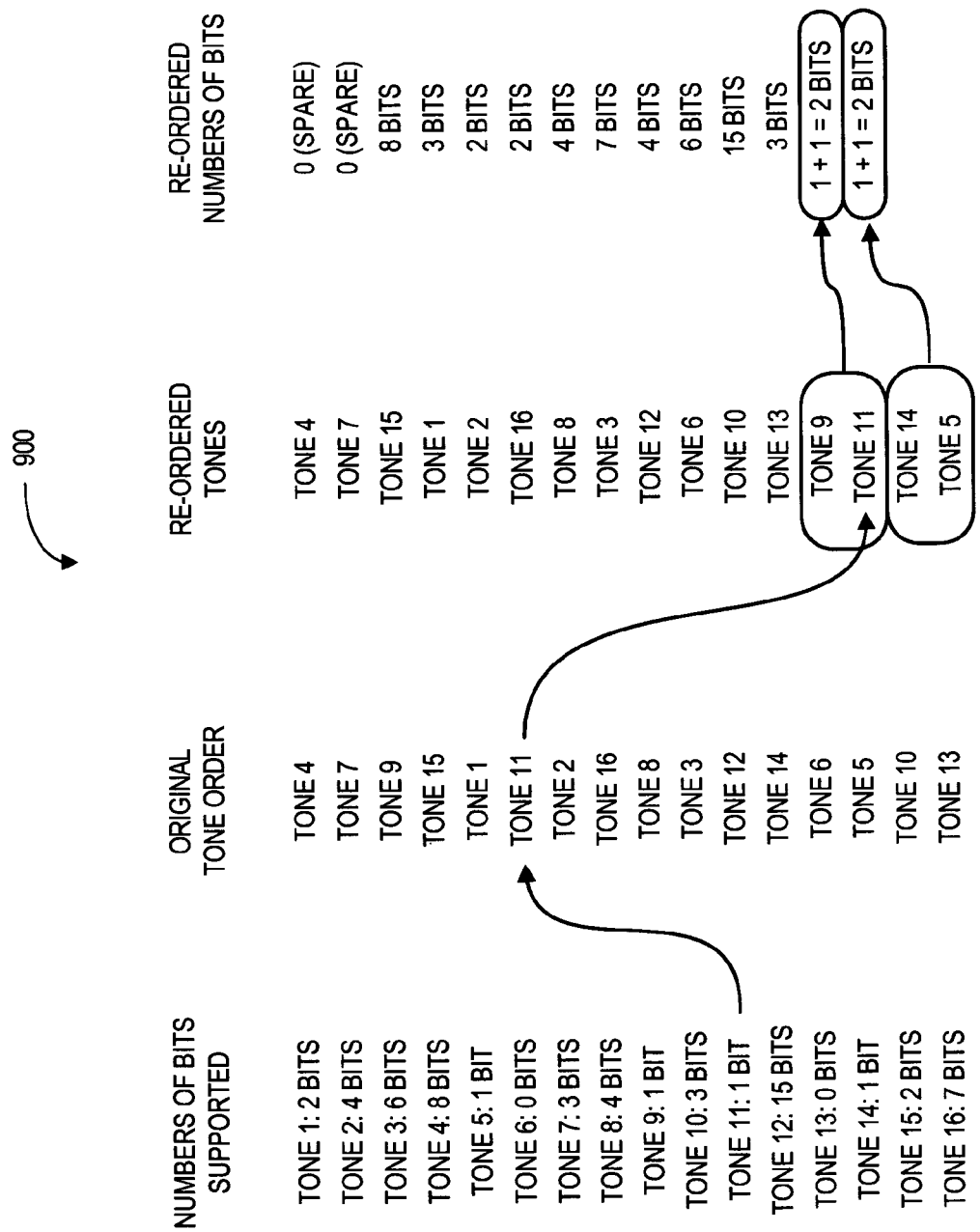
FIG. 9 illustrates a sixteen tone example according to some embodiments.

FIG. 9 illustrates a sixteen tone example 900 according to some embodiments. In this example 900, list of re-ordered tones is generated by moving the following 1-bit constellation tones to the bottom of the list: tone 0, tone 11 (as illustrated by the arrow in FIG. 9), tone 14, and tone 5. Moreover, two pairs of 1-bit constellation tones are identified (tones 9 and 11 and tones 14 and 5) to create two pseudo 2-bit constellations. As a result, two spare locations are inserted at the top of the re-ordered numbers of bits. This example 900 also illustrates that some tones may be unable to support any bits (e.g., tones 6 and 13).

Systems

Figure 10:
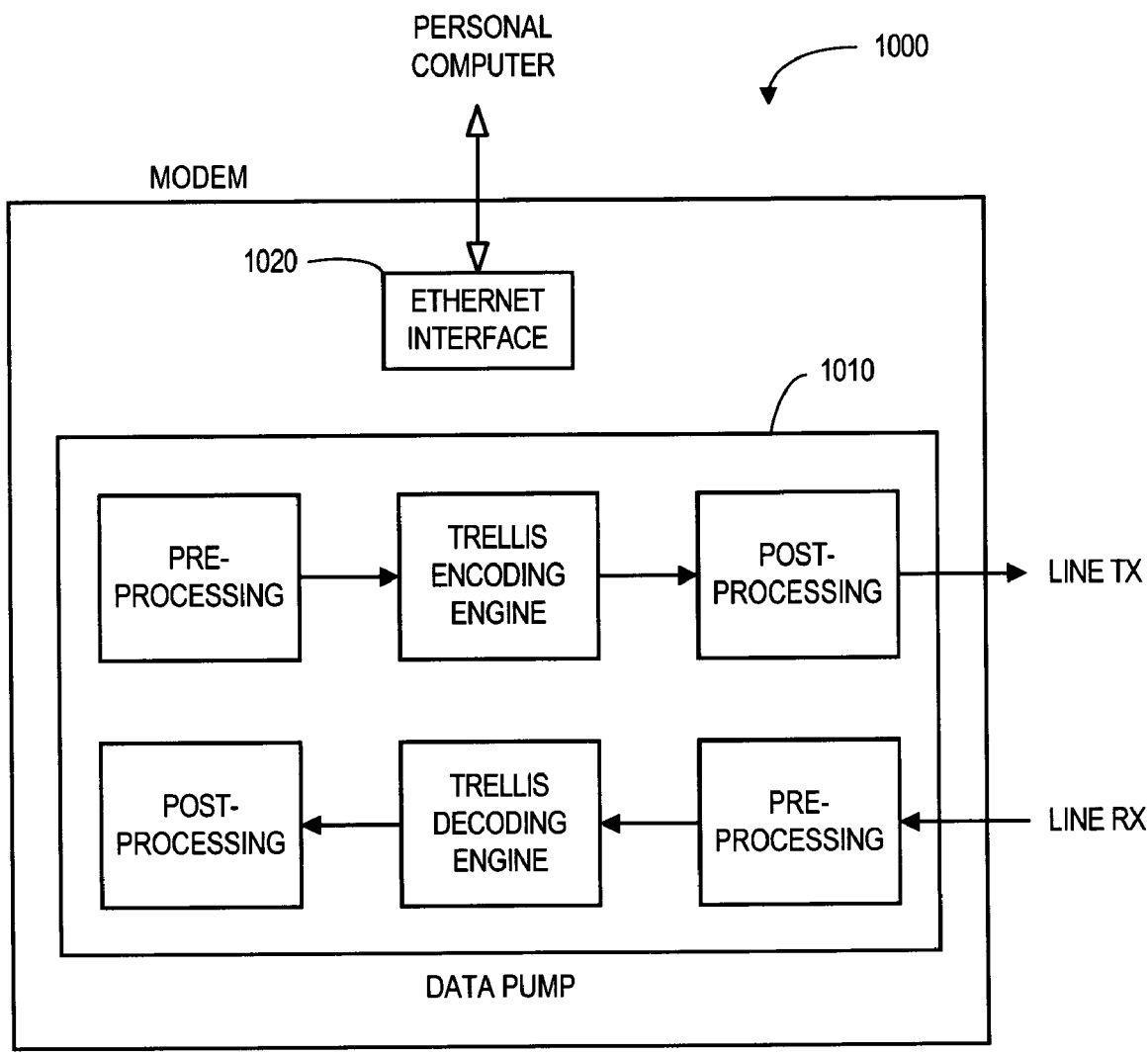
FIG. 10 is a block diagram of a modem according to some embodiments.

FIG. 10 is a block diagram of a modem 1000, such as an Intel® PRO/DSL 3200 modem, according to some embodiments. The modem may, for example, exchange information between a Personal Computer (PC) and a remote device (e.g., via line Tx and line Rx). The modem 1000 includes an ADSL data pump 1010 in accordance with any of the embodiments described herein. For example, the data pump 1010 may include (i) a Trellis encoding engine to encode data associated with a 2-bit constellation tone and (ii) a post-processing device to re-map data associated with the 2-bit constellation tone to data associated with two 1-bit constellation tones. The modem 1000 may also include an Ethernet interface 1020 (e.g., to exchange information with the PC). According to other embodiments the modem 1000 includes a Universal Serial Bus (USB) interface instead of, or in addition to, the Ethernet interface 1020.

Figure 11:
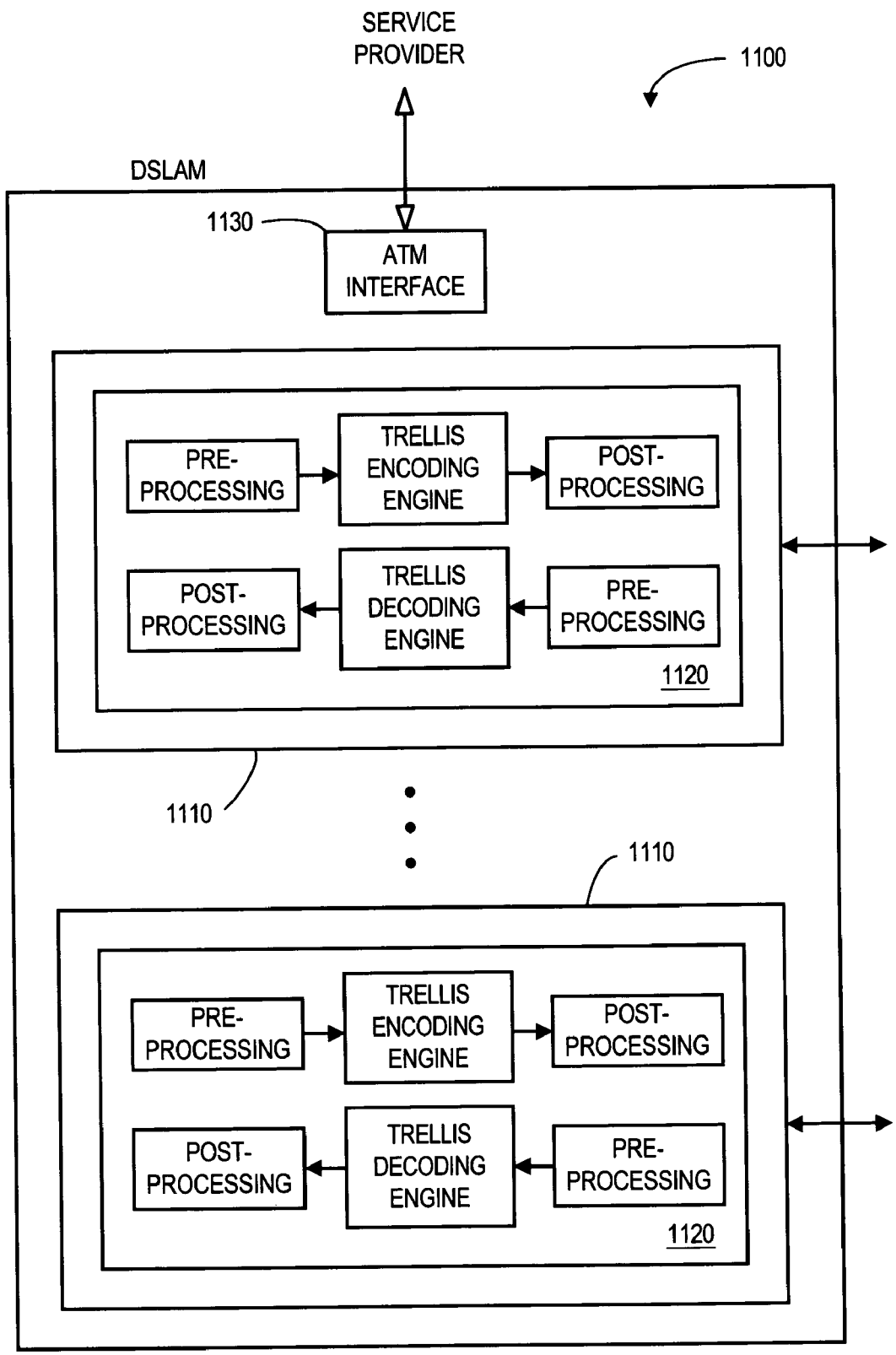
FIG. 11 is a block diagram of a digital subscriber line access multiplexer according to some embodiments.

FIG. 11 is a block diagram of a Digital Subscriber Line Access Multiplexer (DSLAM) 1100 according to some embodiments. The DSLAM 1100 may be located at, for example, a telephone company central office. The DSLAM 1100 includes a bank of modems 1110 that exchange information with multiple remote devices (e.g., subscriber modems). One or more of the modems 1110 may include an ADSL data pump 1120 in accordance with any of the embodiments described herein. For example, the data pump 1120 may include (i) a Trellis encoding engine to encode data associated with a 2-bit constellation tone and (ii) a post-processing device to re-map data associated with the 2-bit constellation tone data associated with two 1-bit constellation tones. The DSLAM 1100 may also include an Asynchronous Transfer Mode (ATM) interface 1130 (e.g., to exchange information with an Internet service provider). According to other embodiments the DSLAM 1100 includes an interface to another high-speed back bone instead of, or in addition to, the ATM interface 1130.

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although particular techniques for creating a re-ordered list of numbers of bits were illustrated, other approaches may be used in accordance with the embodiments described herein. For example, spare locations in the list (e.g., resulting from the pairing of two 1-bit constellation tones) could be inserted at the bottom of the list instead of the top. Similarly, 1-bit constellation tones could be moved to the top of the re-ordered list of tones instead of the bottom.

The several embodiments described herein are solely for the purpose of illustration. Persons skilled in the art will recognize from this description other embodiments may be practiced with modifications and alterations limited only by the claims.

What is claimed is:

1. A method, comprising:
   pairing a first 1-bit constellation tone with a second 1-bit constellation tone to create a 2-bit constellation tone;
   performing a transmit encoding process on data associated with the 2-bit constellation tone, wherein encoded data associated with the 2-bit constellation tone is associated with coordinate [X, Y]; and
   re-mapping data associated with the 2-bit constellation tone to data associated with the first and second 1-bit constellation tones, wherein said re-mapping comprises associating the first 1-bit constellation tone with coordinate [Y, Y] and the second 1-bit constellation tone with coordinate [X, X].

2. The method of claim 1, wherein the transmit encoding process is associated with Trellis code modulation.

3. The method of claim 1, further comprising:
   transmitting data via the first and second 1-bit constellation tones in accordance with the re-mapping.

4. The method of claim 1, further comprising:
   establishing an ordered tone table and an ordered bit table.

5. The method of claim 4, wherein a re-ordered tone table and re-ordered bit table are generated before the transmit encoding process is performed.

6. The method of claim 5, further comprising:
   identifying the first and second 1-bit constellation tones in association with the generation of the re-ordered tone table.

7. The method of claim 5, further comprising:
   including a spare location in the re-ordered bit table.

8. The method of claim 5, wherein Trellis coding is performed in accordance with the re-ordered bit table.

9. The method of claim 5, wherein constellation mapping is performed in accordance with the re-ordered tone table.

10. The method of claim 1, wherein the transmit encoding process is associated with at least one of (i) a discrete multi-tone protocol or (ii) an asynchronous digital subscriber line protocol.

11. An apparatus, comprising:
    a Trellis encoding engine to encode data associated with a 2-bit constellation tone, wherein encoded data associated with the 2-bit constellation tone is associated with coordinate [X, Y]; and
    a post-processing device to re-map data associated with the 2-bit constellation tone to data associated with a first 1 bit constellation tone and a second 1-bit constellation tone, wherein said re-mapping comprises associating the first 1-bit constellation tone with coordinate [Y, Y] and the second 1-bit constellation tone with coordinate [X, X].

12. The apparatus of claim 11, further comprising a pre-processing device to pair the first 1-bit constellation tone with the second 1-bit constellation tone.

13. The apparatus of claim 11, wherein the Trellis encoding engine is an application specific integrated circuit device.

14. The apparatus of claim 11, wherein the post-processing device comprises at least one of: (i) firmware or (ii) software.

15. A computer-readable storage medium having stored thereon instructions that when executed by a machine result in the following:

pairing a first 1-bit constellation tone with a second 1-bit constellation tone to create a 2-bit constellation tone;

arranging for a transmit encoding process to be performed on data associated with the 2-bit constellation tone, wherein encoded data associated with the 2-bit constellation tone is associated with coordinate [X, Y]; and re-mapping data associated with the 2-bit constellation tone to data associated with the first and second 1-bit constellation tones, wherein said re-mapping comprises associating the first 1-bit constellation tone with coordinate [Y, Y] and the second 1-bit constellation tone with coordinate [X, X].

16. A modem, comprising:

an asynchronous digital subscriber line data pump, including:

a Trellis encoding engine to encode data associated with a 2-bit constellation tone, wherein encoded data associated with the 2-bit constellation tone is associated with coordinate [X, Y], and a post-processing device to re-map data associated with the 2-bit constellation tone to data associated with a first 1-bit constellation tone and a second 1-bit constellation tone, wherein said re-mapping comprises associating the first 1-bit constellation tone with coordinate [Y, Y] and the second 1-bit constellation tone with coordinate [X, X]; and an Ethernet interface.

17. The modem of claim 16, wherein the data pump further comprises a pre-processing device to pair the first 1-bit constellation tone with the second 1-bit constellation tone.

18. A digital subscriber line access multiplexer, comprising:

a modem, including:

a Trellis encoding engine to encode data associated with a 2-bit constellation tone, wherein encoded data associated with the 2-bit constellation tone is associated with coordinate [X, Y], and a post-processing device to re-map data associated with the 2-bit constellation tone to data associated with a first 1-bit constellation tone and a second 1-bit constellation tone, wherein said re-mapping comprises associating the first 1-bit constellation tone with coordinate [Y, Y] and the second 1-bit constellation tone with coordinate [X, X]; and an asynchronous transfer mode interface.

19. The digital subscriber line access multiplexer of claim 18, wherein the modem further comprises a pre-processing device to pair the first 1-bit constellation tone with the second 1-bit constellation tone.

* * * * *